(12) United States Patent
DuBose et al.

(10) Patent No.: US 7,795,759 B2
(45) Date of Patent: Sep. 14, 2010

(54) LOAD CONDITION CONTROLLED POWER STRIP

(75) Inventors: Richard G. DuBose, Scottsdale, AZ (US); Walter Thornton, Phoenix, AZ (US); Michael D. Heil, Scottsdale, AZ (US)

(73) Assignee: iGo, Inc, Scottsdale, AZ (US)

( * ) Notice: Subject to any disclaimer, the term of this patent is extended or adjusted under 35 U.S.C. 154(b) by 250 days.

(21) Appl. No.: 12/180,407

(22) Filed: Jul. 25, 2008

(65) Prior Publication Data

US 2009/0322160 A1    Dec. 31, 2009

Related U.S. Application Data

(60) Provisional application No. 61/076,527, filed on Jun. 27, 2008.

(51) Int. Cl.
    *H01H 3/42*    (2006.01)
(52) U.S. Cl. .................................................... 307/126
(58) Field of Classification Search .............. 307/31–41; 340/500, 540, 657, 3.1
    See application file for complete search history.

(56) References Cited

U.S. PATENT DOCUMENTS

| | | | |
|---|---|---|---|
| 3,444,362 A | 5/1969 | Perlman |
| 3,678,416 A | 7/1972 | Burwen |
| 3,753,159 A | 8/1973 | Burwen |
| 4,659,979 A | 4/1987 | Burnham |
| 4,675,537 A | 6/1987 | Mione |
| 4,731,549 A | 3/1988 | Hiddelson |
| 4,874,962 A | 10/1989 | Hermans |
| 4,970,623 A | 11/1990 | Pintar |
| 5,017,844 A | 5/1991 | Lendaro |
| 5,063,164 A | 11/1991 | Goldstein |
| 5,414,475 A | 5/1995 | Trzyna et al. |
| 5,455,487 A | 10/1995 | Mix et al. |
| 5,457,595 A | 10/1995 | Baldwin |

(Continued)

FOREIGN PATENT DOCUMENTS

EP    588173    3/1994

(Continued)

OTHER PUBLICATIONS

PCT/GB2006/001204, International Preliminary Report on Patentability.

(Continued)

*Primary Examiner*—Albert W Paladini
(74) *Attorney, Agent, or Firm*—Snell & Wilmer LLP

(57) ABSTRACT

In accordance with various aspects of the present invention, a method and circuit for reducing power consumption of a power strip is provided. In an exemplary embodiment, a power strip is configured for reducing or eliminating power during idle mode by disengaging an outlet from power input. A power strip may include two or more outlets and two or more outlet circuits, with AC power input connected to the outlets through the outlet circuit(s), which may include a current transformer, a control circuit, and a switch. The current transformer secondary winding provides an output power level signal proportional to the outlet load. If behavior of the current transformer secondary winding indicates that the outlet is drawing substantially no power from the AC power input, the switch facilitates disengaging of the current transformer primary from the outlet.

22 Claims, 6 Drawing Sheets

U.S. PATENT DOCUMENTS

| | | | |
|---|---|---|---|
| 5,541,457 | A | 7/1996 | Morrow |
| 5,579,201 | A | 11/1996 | Karageozian |
| 5,598,042 | A | 1/1997 | Mix et al. |
| 5,615,107 | A | 3/1997 | DeAngelis |
| 5,699,051 | A * | 12/1997 | Billig et al. ............... 340/657 |
| 5,731,947 | A * | 3/1998 | Hirose .................... 361/160 |
| RE36,098 | E | 2/1999 | Vinciarelli |
| 5,923,103 | A | 7/1999 | Pulizzi et al. |
| 5,990,405 | A | 11/1999 | Auten et al. |
| 5,995,384 | A | 11/1999 | Beng |
| 5,999,417 | A | 12/1999 | Schlecht |
| 6,333,862 | B1 | 12/2001 | Lee |
| 6,396,166 | B1 | 5/2002 | Kim |
| 6,498,466 | B1 | 12/2002 | Edwards |
| 6,501,195 | B1 | 12/2002 | Barton |
| 6,509,658 | B1 | 1/2003 | Kim |
| 6,528,902 | B1 | 3/2003 | Barton |
| 6,586,849 | B2 * | 7/2003 | Tarr ....................... 307/38 |
| 6,670,597 | B1 | 12/2003 | Kitamura et al. |
| 6,738,914 | B2 | 5/2004 | Christopher |
| 6,754,092 | B2 | 6/2004 | McDowell et al. |
| 6,759,762 | B2 | 7/2004 | Barton |
| 6,759,763 | B2 * | 7/2004 | Barton ..................... 307/39 |
| 6,781,356 | B1 | 8/2004 | Yang et al. |
| 6,811,444 | B2 | 11/2004 | Geyer |
| 6,853,173 | B2 | 2/2005 | Caine et al. |
| 6,917,506 | B2 | 7/2005 | Chou |
| 6,940,272 | B2 | 9/2005 | Niv |
| 6,995,807 | B2 | 2/2006 | Libera |
| 7,027,300 | B2 | 4/2006 | Lord |
| 7,132,763 | B2 * | 11/2006 | Rendic ..................... 307/31 |
| 7,141,891 | B2 * | 11/2006 | McNally et al. ............. 307/39 |
| 7,193,335 | B2 * | 3/2007 | Palmer et al. ............... 307/39 |
| 7,285,874 | B2 | 10/2007 | Menas et al. |
| 7,332,834 | B2 | 2/2008 | Lee |
| 7,444,530 | B2 | 10/2008 | Deppe et al. |
| 2002/0135474 | A1 | 9/2002 | Sylliassen |
| 2003/0042879 | A1 | 3/2003 | Huh et al. |
| 2004/0037019 | A1 | 2/2004 | Yokozawa |
| 2004/0070299 | A1 | 4/2004 | Cyr |
| 2004/0105285 | A1 | 6/2004 | Tanaka et al. |
| 2004/0132407 | A1 | 7/2004 | Hein-Magnussen et al. |
| 2004/0257054 | A1 | 12/2004 | Balakrishnan et al. |
| 2005/0041360 | A1 | 2/2005 | Dettweiler |
| 2005/0099164 | A1 | 5/2005 | Yang |
| 2005/0207189 | A1 | 9/2005 | Chen |
| 2006/0098462 | A1 | 5/2006 | Usui |
| 2006/0271800 | A1 | 11/2006 | Li et al. |
| 2006/0273764 | A1 | 12/2006 | Huang |
| 2007/0038334 | A1 | 2/2007 | Chou |
| 2007/0115696 | A1 | 5/2007 | Berghegger |
| 2007/0145946 | A1 | 6/2007 | Chiang et al. |
| 2007/0236180 | A1 | 10/2007 | Rodgers |
| 2007/0262646 | A1 | 11/2007 | Lee |
| 2008/0012533 | A1 | 1/2008 | Guang et al. |
| 2008/0042622 | A1 | 2/2008 | Wong et al. |
| 2008/0049452 | A1 | 2/2008 | Van Bodegraven |
| 2008/0106148 | A1 | 5/2008 | Gelonese |
| 2008/0261453 | A1 | 10/2008 | Chen |
| 2008/0278975 | A1 | 11/2008 | Degen et al. |
| 2009/0121894 | A1 | 5/2009 | Wilson et al. |
| 2009/0224603 | A1 | 9/2009 | Perper et al. |
| 2009/0235107 | A1 | 9/2009 | Gelonese |

FOREIGN PATENT DOCUMENTS

| | | |
|---|---|---|
| JP | 2001136661 | 5/2001 |
| JP | 2003-05-09 | 1/2009 |
| KR | 10-0436114 | 4/2002 |
| KR | 10-2002-0030869 | 4/2004 |
| WO | WO2005076416 | 8/2005 |
| WO | 2006/106310 | 12/2006 |
| WO | WO2007135429 | 11/2007 |
| WO | WO2008037428 | 3/2008 |

OTHER PUBLICATIONS

PCT International Search Report and Written Opinion, issued Jan. 20, 2010, PCT/US2009/046761, 13 pages.

International Search Report and Written Opinion, dated Feb. 17, 2010.

PCT International Search Report and Written Opinion issued Aug. 4, 2009, PCT/US2009/039549, 11 pages.

* cited by examiner

LOAD CONDITION CONTROLLED POWER STRIP

CROSS-REFERENCE TO RELATED APPLICATIONS

This application claims priority to and benefit of U.S. Provisional Application No. 61/076,527, filed Jun. 6, 2008, and entitled "LOAD CONDITION CONTROLLED POWER STRIP", and hereby incorporated by reference.

FIELD OF INVENTION

The present invention relates to reducing power consumption in electronic devices. More particularly, the present invention relates to a circuit and method for disengaging an outlet in a power strip from a power input when idle load conditions are present.

BACKGROUND OF THE INVENTION

The increasing demand for lower power consumption and environmentally friendly consumer devices has resulted in interest in power supply circuits with "green" technology. For example, on average, a notebook power adapter continuously "plugged in" spends 67% of its time in idle mode. Even with a power adapter which conforms to the regulatory requirement of dissipating less then 0.5 watts/hour, this extended idle time adds up to 3000 watt hours of wasted energy each year per adapter. When calculating the wasted energy of the numerous idle power adapters, the power lost is considerable.

Power strips are used to multiply the number of AC outlets available from a single AC socket. In an office or home environment, a computer, monitor, printer, scanner, and other electronic devices are often connected to the same power strip. When not in use, these connected devices will often be left on and go into self-imposed idle modes that typically consume less than 1 watt per device. Even though each is consuming standby power, the total power delivered by the power strip can be as much as the number of outlets used times the idle power, perhaps as great as 6 watts or more. This multiplicity of wasted idle power can be reduced or eliminated if the power strip can learn or be programmed to sense the idle condition of each outlet and turn that outlet off if idle conditions are present.

SUMMARY OF THE INVENTION

In accordance with various aspects of the present invention, a method and circuit for reducing power consumption of a power strip during idle conditions is provided. In an exemplary embodiment, a power strip is configured for reducing or eliminating power during idle mode by disengaging at least one outlet from a power input. A power strip may include one or more outlets and one or more outlet circuits, with AC power input connected to the outlets through the outlet circuit(s). The outlet circuit may include a current transformer, a control circuit, and a switch. The secondary winding of the current transformer provides an output power level signal that is proportional to the load at the outlet. In an exemplary embodiment, if behavior of the secondary winding of the current transformer indicates that at least one outlet is drawing substantially no power from the AC power input, the switch facilitates disengaging of the primary circuit of the current transformer from such outlet.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

The present invention may be described herein in terms of various functional components and various processing steps. It should be appreciated that such functional components may be realized by any number of hardware or structural components configured to perform the specified functions. For example, the present invention may employ various integrated components, such as buffers, current mirrors, and logic devices comprised of various electrical devices, e.g., resistors, transistors, capacitors, diodes and the like, whose values may be suitably configured for various intended purposes. In addition, the present invention may be practiced in any integrated circuit application. However for purposes of illustration only, exemplary embodiments of the present invention will be described herein in connection with a sensing and control system and method for use with power strip circuits. Further, it should be noted that while various components may be suitably coupled or connected to other components within exemplary circuits, such connections and couplings can be realized by direct connection between components, or by connection through other components and devices located thereinbetween.

Figure 1A:
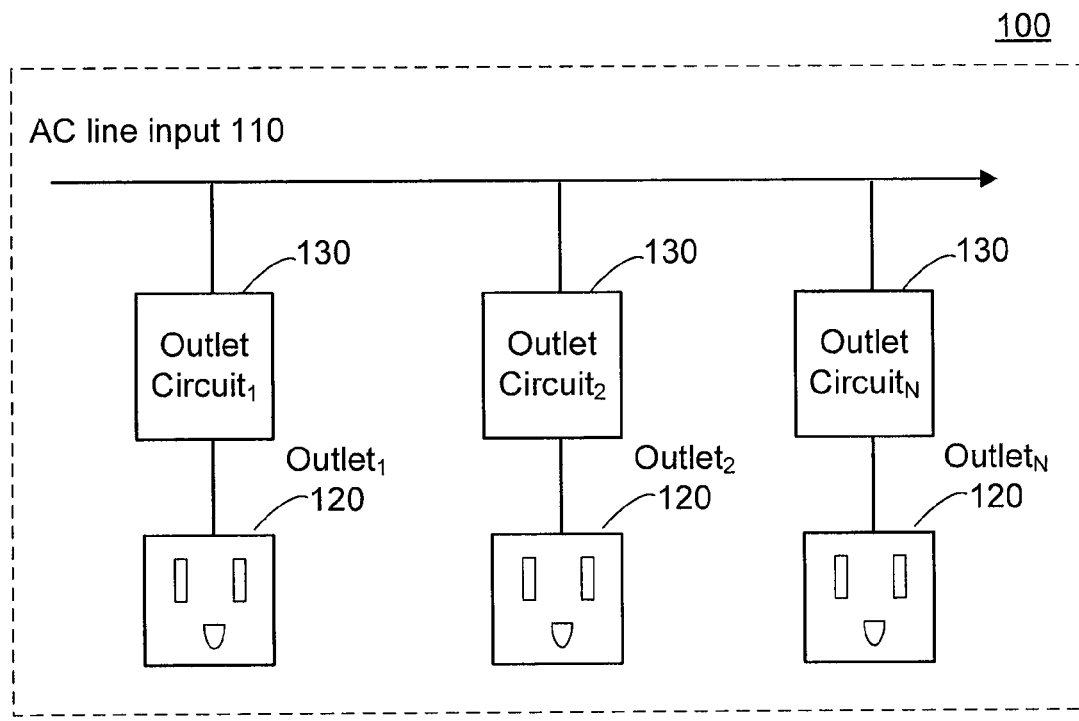
FIG. 1A illustrates a block diagram of an exemplary load condition controlled power strip.
Figure 1B:
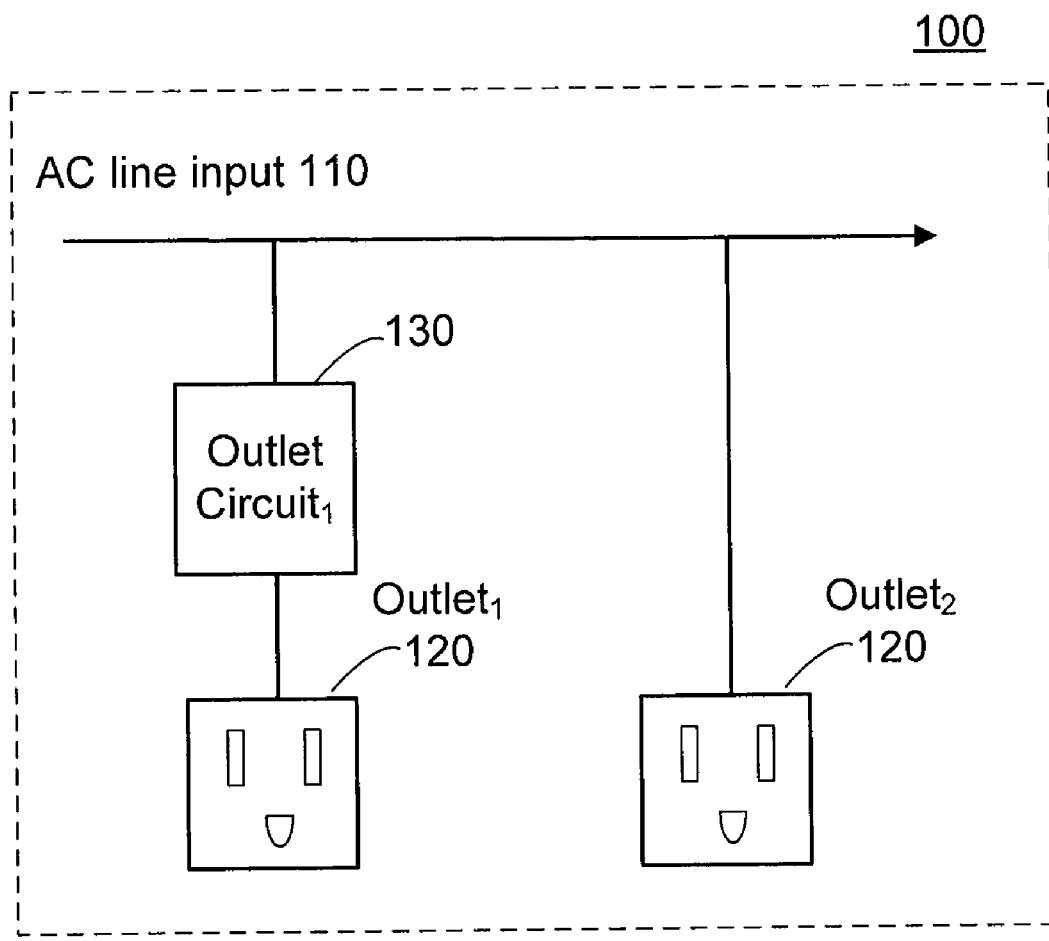
FIG. 1B illustrates another block diagram of an exemplary load condition controlled power strip in accordance with an exemplary embodiment.

In accordance with various aspects of the present invention, a power strip configured for reducing or eliminating power during idle mode by disengaging power input from at least one outlet is disclosed. In an exemplary embodiment, and with reference to FIG. 1A, a power strip 100 comprises two or more outlets 120 and two or more outlet circuits 130. In another exemplary embodiment (not shown), power strip 100 comprises a single outlet 120 and a single outlet circuit 130. In yet another exemplary embodiment, and with reference to FIG. 1B, power strip 100 comprises at least one outlet 120 coupled with outlet circuit 130 and at least one outlet 120 directly connected to an AC line input 110.

Figure 2:
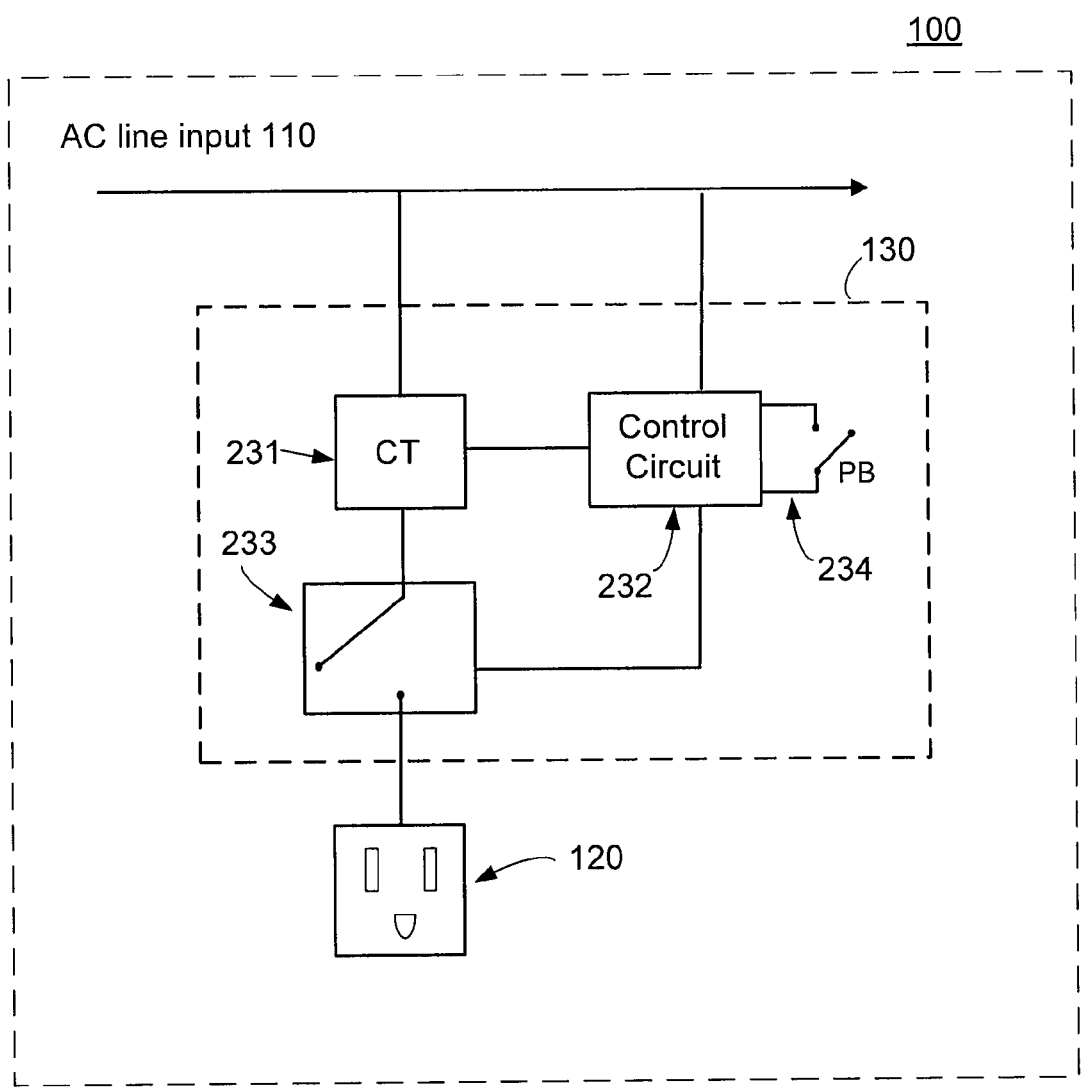
FIG. 2 illustrates a block diagram of an exemplary load condition controlled power strip in accordance with an exemplary embodiment.

In an exemplary embodiment, and with reference to FIG. 2, power strip 100 comprises AC line input 110 connected to outlet circuit 130, which in turn is connected to outlet 120. The outlet circuit 130 comprises a current measuring system 231, a control circuit 232, and a switch 233. In an exemplary embodiment, current measuring system 231 comprises a current transformer 231 having a primary circuit and a secondary winding for illustration purposes. However, current measuring system 231 may also comprise a resistor with a differential amplifier, a current sensing chip, a Hall-effect device, or any other suitable component configured to measure current as now known or hereinafter devised. Current transformer 231 provides an output power level signal that is proportional to the load at outlet 120. Furthermore, switch 233 connects the primary circuit of current transformer 231 to outlet 120.

Furthermore, in one embodiment, AC line input 110 is a standard 3 wire grounded plug and cord set that connects to the body of power strip 100. However, AC line input 110 can be suitably configured in any AC power input configuration or replaced with any other input power configuration. The AC line input 110 is connected in parallel to a number of similar outlet circuits 130 that lie between the AC line input 110 and outlets$_{1-N}$ 120. Furthermore, AC line input 110 may be connected to a 110 volt or 220 volt power source in an exemplary embodiment.

In an exemplary embodiment, control circuit 232 may comprise at least one of, or a combination of: a latching circuit, a state machine, and a microprocessor. In one embodiment, control circuit 232 monitors the condition of the secondary winding of current transformer 231 and controls the operation of switch 233. Furthermore, in an exemplary embodiment, control circuit 232 receives a low frequency or DC signal from current transformer 231. The low frequency signal, for example, may be 60 Hz. This low frequency or DC signal is interpreted by control circuit 232 as the current required by the load at outlet 120.

Figure 3:
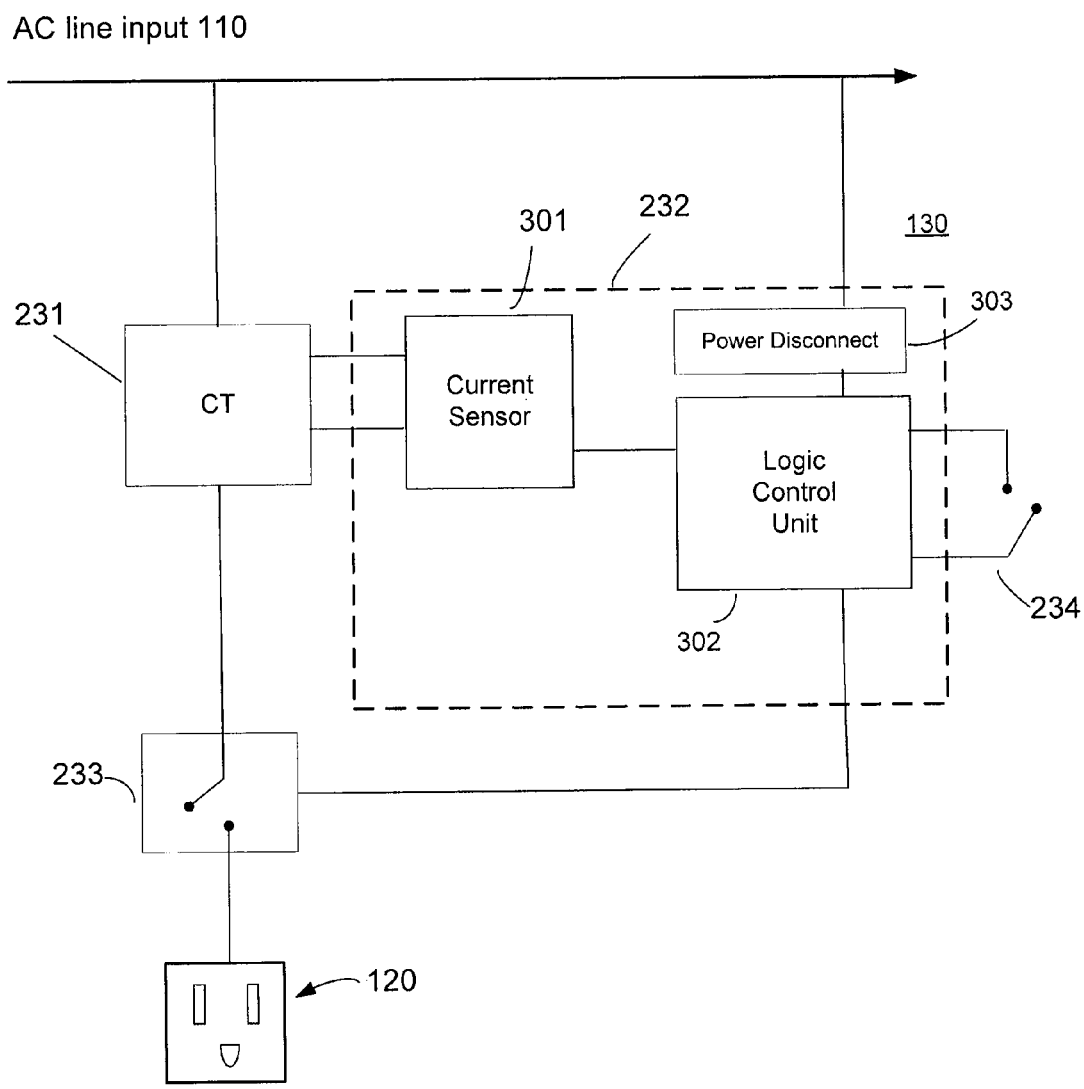
FIG. 3 illustrates a circuit diagram of an exemplary control circuit for use within an exemplary load condition controlled power strip in accordance with an exemplary embodiment.
Figure 4:
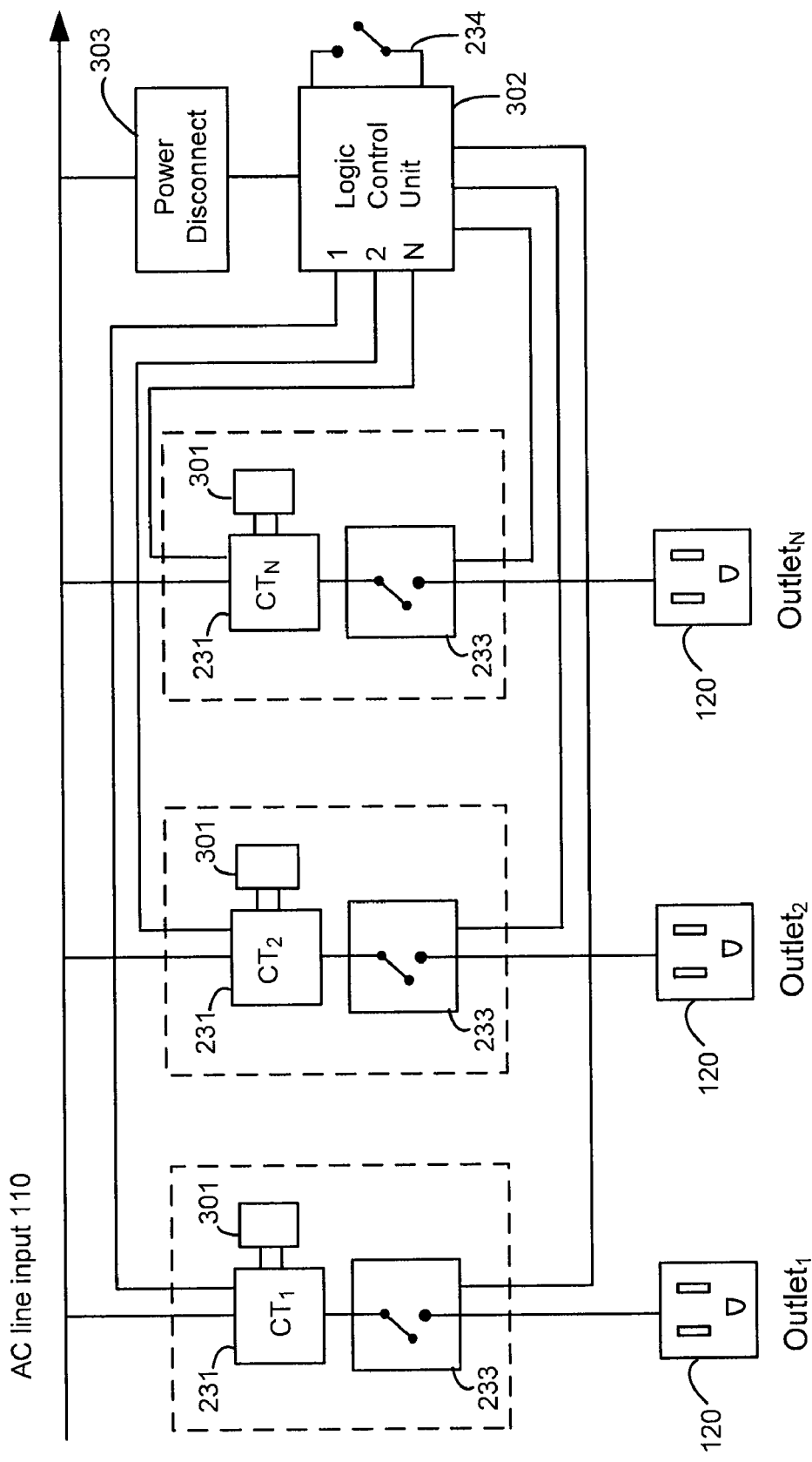
FIG. 4 illustrates a block diagram of an exemplary load condition controlled power strip in accordance with an exemplary embodiment.

Control circuit 232 can comprise various structures for monitoring the condition of the secondary winding of current transformer 231 and controlling the operation of switch 233. In an exemplary embodiment, with reference to FIG. 3, control circuit 232 includes a current sensor 301 and a logic control unit 302. Current sensor 301 monitors the output of a current measuring system, such as for example, the secondary winding of current transformer 231, which is an AC voltage proportional to the load current. Also, current sensor 301 provides a signal to logic control unit 302. In one embodiment, the signal may be a DC voltage proportional to the current through current sensor 301. In another embodiment, the signal may be a current proportional to the current through current sensor 301. In another exemplary embodiment, and with momentary reference to FIG. 4, outlet circuit 130 of the power strip comprises a logic control unit 302 that is in communication with, and controls, more than one current transformer 231 and more than one switch 233.

In an exemplary embodiment, logic control unit 302 is powered by an energy storage capacitor. Logic control unit 302 may briefly connect the storage capacitor to AC line input 110 in order to continue powering logic control unit 302. In another embodiment, logic control unit 302 may be powered by a battery or other energy source. This energy source is also referred to as housekeeping or hotel power; it functions as a low auxiliary power source. In one embodiment, auxiliary power is taken from AC line input 110. For further detail on similar current monitoring, see U.S. Provisional Application 61/052,939, hereby incorporated by reference.

In an exemplary embodiment, logic control unit 302 is a microprocessor capable of being programmed prior to, and after integration of power strip 100 in an electronic device. In one embodiment, a user is able to connect to logic control unit 302 and customize the parameters of power strip 100. For example, a user may set the threshold level and a sleep mode duty cycle of power strip 100. Data from power strip 100 could be transmitted regarding, for example, the historical power consumption and/or energy saved. The bidirectional data transfer between power strip 100 and a display device may be achieved through a wireless signal, such as for example, an infra-red signal, a radio frequency signal, or other similar signal. The data transfer may also be achieved using a wired connection, such as for example, a USB connection or other similar connection.

In accordance with an exemplary embodiment, control circuit 232 may further comprise a power disconnect 303 in communication with logic control unit 302. Power disconnect 303 is configured to isolate logic control unit 302 from AC line input 110 and reduce power loss. While isolated, logic control unit 302 is powered by the storage capacitor or other energy source and logic control unit 302 enters a "sleep" mode. If the storage capacitor reaches a low power level, power disconnect 303 is configured to reconnect logic control unit 302 to AC line input 100 to recharge the storage capacitor. In an exemplary embodiment, power disconnect 303 is able to reduce the power loss from a range of microamperes of leakage to a range of nanoamperes of leakage.

In another exemplary embodiment, control circuit 232 receives a control signal that is impressed upon AC line input 110 by another controller. The control signal may be, for example, the X10 control protocol or other similar protocol. Control circuit 232 may receive the control signal through the secondary winding of current transformer 231, from a coupled AC line input 110, or any other suitable means configured to couple AC line input 110 to control circuit 232 as now known or hereinafter devised. This control signal may come from within power strip 100 or may come from an external controller. The control signal may be a high frequency control signal or at least a control signal at a frequency different than the frequency of AC line input 110. In an exemplary embodiment, control circuit 232 interprets the control signal to engage or disengage switch 233. In another embodiment, an external controller may transmit a signal to turn power strip 100 to an "on" or "off" condition.

In an exemplary embodiment, if behavior of the secondary winding of current transformer 231 indicates that outlet 120 is drawing substantially no power from AC line input 110, switch 233 facilitates or controls disengaging of the primary circuit of current transformer 231 from outlet 120, i.e., switch 233 facilitates the disengaging of a power source from outlet 120. In an exemplary embodiment, the secondary winding of current transformer 231 is monitored for an AC waveform at the AC line frequency, where the AC waveform has an RMS voltage proportional to the load current passing through the primary circuit of current transformer 231 to outlet 120. In another embodiment, the AC waveform is rectified and filtered to generate a DC signal before being received by control circuit 232. The DC signal is proportional to the load current passing through the primary circuit of current transformer 231 to outlet 120.

In one embodiment, the phrase "substantially no power" is intended to convey that the output power is in the range of approximately 0-1% of a typical maximum output load. In an exemplary embodiment, switch 233 is configured to control the connection of the primary circuit of current transformer 231 to outlet 120 and comprises a switching mechanism to substantially disengage the primary circuit of current transformer 231 from outlet 120. Switch 233 may comprise at least one of a relay, latching relay, a TRIAC, and an optically isolated TRIAC.

By substantially disabling the primary circuit of current transformer 231, the power consumption at outlet 120 is reduced. In one embodiment, substantially disabling outlet 120 is intended to convey that the output signal of the secondary winding of current transformer 231 has been interpreted by control circuit 232 as sufficiently low so that it is appropriate to disengage switch 233 and remove power from outlet 120.

In another exemplary embodiment, outlet circuit 130 further comprises a reconnection device 234, which is configured to enable the closure of switch 233 through logic control unit 302. The closure of switch 233 reconnects outlet 120 to the primary circuit of current transformer 231 and AC line input 110. In an exemplary embodiment, reconnection device 234 comprises a switch device that may be closed and opened in various manners. For example, reconnection device 234 can comprise a push button that may be manually operated. In one embodiment, the push button is located near outlet 120 on power strip 100, for example, on the same surface of power strip 100 as outlet 120 or on an adjacent side of power strip 100 to outlet 120. In another exemplary embodiment, reconnection device 234 is located remote to power strip 100 to allow a user to re-enable power to an outlet of power strip 100 without having direct contact with power strip 100. In another embodiment, reconnection device 234 is affected remotely by signals traveling through AC line input 110 that control circuit 232 interprets as on/off control. In yet another embodiment, reconnection device 234 is controlled by a wireless signal, such as for example, an infra-red signal, a radio frequency signal, or other similar signal.

In accordance with another exemplary embodiment, switch 233 is automatically operated on a periodic basis. For example, switch 233 may automatically reconnect after a few or several minutes or tens of minutes, or any period more or less frequent. In one embodiment, switch 233 is automatically reconnected frequently enough that a battery operated device connected to power strip 100 will not completely discharge internal batteries during a period of no power at the input to the connected device. After outlet 120 is reconnected, in an exemplary embodiment, outlet circuit 130 tests for, or otherwise assesses, load conditions. If the load condition on outlet 120 is increased above previously measured levels, outlet 120 will remain connected to the primary circuit of current transformer 231 until the load condition has returned to a selected or predetermined threshold level indicative of a "low load". In an exemplary embodiment, the determination of load conditions at re-connect are made after a selected time period had elapsed, for example after a number of seconds or minutes, so that current inrush or initialization events are ignored. In another embodiment, the load conditions may be averaged over a selected time period of a few seconds or minutes so that short bursts of high load average out. In yet another exemplary embodiment, power strip 100 comprises a master reconnection device that can re-engage all outlets 120 to AC line input 110.

In an exemplary method of operation, power strip 100 has switch 233 closed upon initial power-up, such that power flows to outlet 120. When load conditions at outlet 120 are below a threshold level, control circuit 232 opens switch 233 to create an open circuit and disengage outlet 120 from the AC power signal. This disengaging effectively eliminates any idle power lost by outlet 120. In one embodiment, the threshold level is a predetermined level, for example approximately one watt of power or less flowing to outlet 120.

In an exemplary embodiment, different outlets 120 may have different fixed threshold levels such that devices having a higher power level in idle may be usefully connected to power strip 100 for power management. For example, a large device may still draw about 5 watts during idle, but would never be disconnected from AC line input 110 if the connected 120 had a threshold level of about 1 watt. In various embodiments, certain outlets 120 may have a higher threshold levels to accommodate high power devices, or lower threshold levels for lower power devices.

In another embodiment, the threshold level is a learned level. The learned level may be established through long term monitoring by control circuit 232 of load conditions at outlet 120. A history of power levels is created over time by monitoring and may serve as a template of power demand. In an exemplary embodiment, control circuit 232 examines the history of power levels and decides whether long periods of low power demand were times when a device connected at outlet 120 was in a low, or lowest, power mode. In an exemplary embodiment, control circuit 232 disengages outlet 120 during low power usage times when the period of low power matches the template. For example, the template might demonstrate that the device draws power through outlet 120 for eight hours, followed by 16 hours of low power demand.

In another exemplary embodiment, control circuit 232 determines the approximate low power level of the electronic device connected at outlet 120, and sets a threshold level to be a percentage of the determined approximate low power level. For example, control circuit 232 may set the threshold level to be about 100-105% of the approximate low power level demand. In another embodiment, the threshold demand may be set at about 100-110% or 110-120% or more of the approximate low power level demand. In addition, the low power level percentage range may be any variation or combination of the disclosed ranges.

Figure 5:
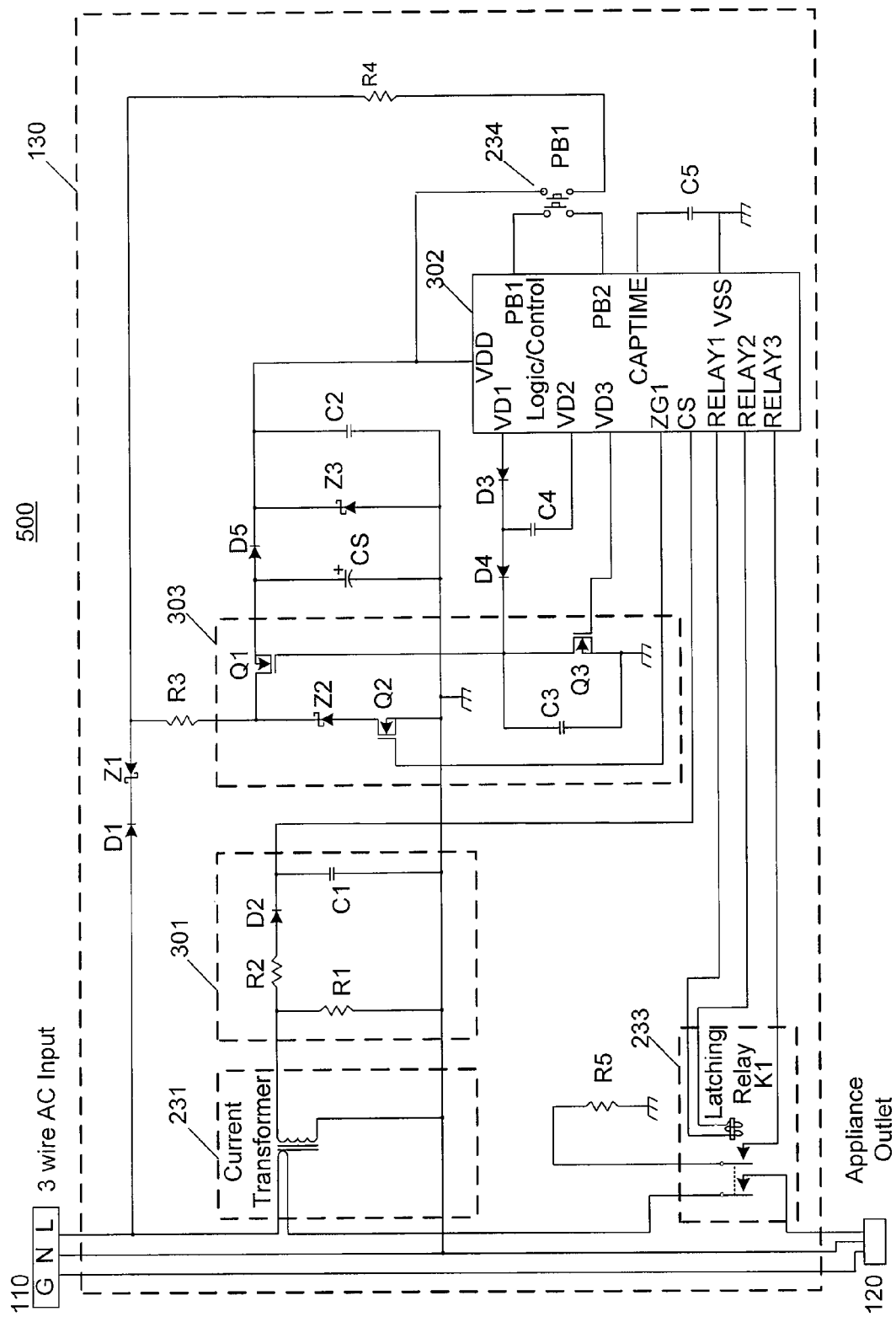
FIG. 5 illustrates a schematic diagram of an exemplary control circuit for use within an exemplary load condition controlled power strip in accordance with an exemplary embodiment.

Having disclosed various functions and structures for an exemplary power strip configured for reducing or eliminating power during idle mode by disengaging power input, a detailed schematic diagram of an exemplary power strip circuit 500 can be provided in accordance with an exemplary embodiment of the present invention. With reference to FIG. 5, in an exemplary embodiment of power strip 500, outlet circuit 130 comprises current transformer 231, current sensor 301, logic control unit 302, power disconnect 303, reconnection device 234, and switch 233.

In one embodiment, current transformer 231 and current sensor 301 combine to measure the current in AC line input and convert said current to a proportional DC voltage that can be read by logic control unit 302. Furthermore, switch 233 may comprise a latching relay that provides a hard connect/disconnect of AC line input 110 to outlet 120 after a command from logic control unit 302. Switch 233 alternates between open and closed contacts. Furthermore, switch 233 holds its position until reset by logic control unit 302, and will hold position without consuming any power in the relay coil K1.

In an exemplary embodiment, logic control unit 302 comprises a microcontroller that receives input of the current in the AC line, controls the state of switch 233 and reads or otherwise assesses the state or position of the contacts of reconnection device 234 and switch 233. In addition, logic control unit 302 learns and stores the power profile for an electronic device connected to outlet 120. In another exemplary embodiment, outlet circuit 130 further comprises reconnection device 234, which is activated to turn on outlet 120 when outlet circuit 130 is first connected to AC line input 110 or when full power is needed immediately at outlet 120.

In an exemplary embodiment, power disconnect 303 comprises a network of transistors Q1, Q2, Q3 which are used to condition AC line input 110 to a safe level suitable for logic control unit 302 and isolate logic control unit 302 from AC line input 110. In another embodiment, power disconnect 303 comprises relays in addition to, or in place of, the transistors of the prior embodiment.

Initial plug-in of power strip 500 involves connecting power strip 500 to an AC power source. In an exemplary method, upon initial plug-in of power strip 500 to a power source, all circuits of outlet circuit 130 are dead and switch 233 is in the last position set by logic control unit 302. This initial condition may or may not provide power to outlet 120. When all the circuits are dead, there is no current flow into outlet circuit 130. This is due to the isolation provided by power disconnect 303 and reconnection device 234 in a normal, open position. In an exemplary embodiment, power disconnect 303 comprises transistors Q1, Q2, Q3 and capacitor C3. In this state, only leakage current will flow through transistors Q1, Q2 and the leakage current will be on the order of approximately tens of nanoamperes. Furthermore, current transformer 231 provides dielectric isolation from primary side to secondary side so that only small leakage current flows due to the inter-winding capacitance of current transformer 231.

With continued reference to FIG. 5, in an exemplary embodiment and for illustration purposes, a user may reconnect the circuit using reconnection device 234 to establish a current path through diode D1, zener diode Z1, resistor R4, reconnection device 234 and zener diode Z3. Diode D1 serves to half-wave rectify the AC line to drop the peak to peak voltage in half. Zener diode Z1 further reduces the voltage from diode D1, for example to about 20 volts. Zener diode Z3 and resistor R4 form a current limited zener regulator that provides an appropriate DC voltage at the VDD input to logic control unit 302 while reconnection device 234 is held. In addition, capacitor C2 smoothes the DC signal on zener diode Z3 and provides storage during the contact bounce of reconnection device 234. Capacitor C2 is sized to provide sufficient storage during the start-up time of logic control unit 302, and capacitor C2 in combination with resistor R4 provides a fast rising edge on the VDD input to properly reset logic control unit 302. Furthermore, diode D5 isolates capacitor C2 from capacitor CS so the rise time constant of capacitor C2 and resistor R4 is not affected by the large capacitance of capacitor CS. When capacitor CS is powering logic control unit 302, the current of capacitor CS passes through diode D5.

In an exemplary method, if reconnection device 234 is activated for a few milliseconds, logic control unit 302 is configured to initialize and immediately set up to provide its own power before reconnection device 234 is released. This is accomplished from voltage doubler outputs VD1-VD3 and ZG1 of logic control unit 302. First, output ZG1 is driven high to turn on transistor Q2. With transistor Q2 on, a current path is established through resistor R3 and zener diode Z2 providing a regulated voltage at the drain of transistor Q1. This regulated voltage is similar to that produced by zener diode Z3 and is appropriate for the VDD input of logic control unit 302. Second, after the voltage on zener diode Z2 has stabilized for a few microseconds, logic control unit 302 outputs VD1-VD3 begin switching to produce a gate drive signal to turn on transistor Q1. The signals produced by outputs VD1-VD3 and components including capacitor C3, transistor Q3, capacitor C4, diode D3 and diode D4 produce a voltage at the gate of transistor Q1 that is about twice the voltage on input VDD of logic control unit 302. This voltage doubling turns transistor Q1 on hard. Once transistor Q1 is on, the voltage at zener diode Z2 charges capacitor CS. In an exemplary embodiment, capacitor CS is a large storage capacitor that is used to power logic control unit 302 when reconnection device 234 is not being activated. After capacitor CS has been charged for a few milliseconds, outputs VD1-VD3 and ZG1 return to a rest state and transistors Q1 and Q2 are turned off. In this embodiment, logic control unit 302 is operating off the stored charge in capacitor CS and not drawing power from AC line input 110. When reconnection device 234 is no longer active, capacitor CS will continue to power logic control unit 302.

If outlet 120 is idling and drawing substantially no power, logic control unit 302 may be able to disengage from drawing power and enter a "sleep" mode. In an exemplary method, and with further reference to FIG. 5, when logic control unit 302 is operating from the stored energy in capacitor CS, a timing function is enabled in logic control unit 302 that uses capacitor C5 to perform the timing function. Capacitor C5 is briefly charged by the CAPTIME output of logic control unit 302 and over time capacitor C5 discharge rate will mimic the decay of the voltage on capacitor CS. Once capacitor C5 voltage at input CAPTIME reaches a low level, logic control unit 302 will set the state of outputs VD1-VD3 and ZG1 to again recharge capacitor CS from the AC line. This process repeats over and over so power is never lost to logic control unit 302. The recharge process takes only milliseconds to operate, depending on the size of capacitor CS.

Furthermore, in an exemplary method, when logic control unit 302 is not busy recharging capacitor CS, switching relay K1, or measuring power drawn from outlet 120, logic control unit 302 is operating in a deep sleep mode that stops all, or substantially all, internal activity and waits for capacitor C5 to discharge. This sleep mode consumes very little power and allows the charge on storage capacitor CS to persist for many seconds. If reconnection device 234 is activated during the sleep mode, logic control unit 302 will resume normal operation and set or reset relay K1. Alternatively, if capacitor C5 voltage falls too low, logic control unit 302 will again recharge capacitor CS and then return to sleep mode.

While an electronic device is in an idle mode, power strip 100 may continue to monitor for changes in the power drawn by the electronic device. In an exemplary method, while logic control unit 302 continuously goes in and out of sleep mode to re-power itself, logic control unit 302 will also periodically test the power being drawn from outlet 120. The period of power testing is much greater than that of capacitor CS charging and, for example, may be only tested every ten or more minutes. In accordance with an exemplary method, there are at least three possible outcomes from the result of power testing: 1) the device is operating and the switch is not in standby condition, 2) the device is not operating but the switch is not in a standby condition, or 3) the switch is in a standby condition.

For the outcome when the device is operating and the switch is not in a standby condition, relay K1 has been previously set to deliver power to outlet 120 and power testing shows an appreciable load current is being drawn by the electronic device connected. An "appreciable load" may be defined by some fixed value programmed into logic control unit 302, or it may be the result of a number of power tests and be the typical load current for this electronic device. A power test result here will be interpreted as normal conditions and logic control unit 302 will go back into sleep mode cycling until another time period, such as ten minutes, has passed when the power test will be made again. In another exemplary embodiment, the duration of the sleep mode cycling is determined by a user. For example, a user may set the sleep mode duration to be one, two, or five minutes and may do so using a dial, a digital input, a push button, keypad or any other suitable means now know or hereinafter devised.

For the outcome when the device is not operating but the switch is not in a standby condition, relay K1 has been previously set to deliver power to outlet 120 and power testing shows a negligible load current being drawn by the device connected. The "negligible load" may be some fixed value programmed into logic control unit 302, or it may be the result of a number of power tests and be the typical minimum found for this electronic device. In either case the action taken by logic control unit 302 will be to set relay K1 to an open condition by using logic control unit 302 outputs RELAY1-RELAY3 to energize relay coil K1. The state of relay K1 is determined by logic control unit 302 testing for the presence of resistor R5, since logic control unit 302 may not know the previous state of relay K1, for example, starting from power off state.

For the outcome when the switch is in a standby condition, that is, relay K1 has been set to remove power from outlet 120, logic control unit 302 must set relay K1 to a closed condition to allow AC power to be applied to the outlet. In an exemplary method, once relay K1 is set, a period of time is allowed to elapse before the power testing is done. This delay allows for the electronic device attached to outlet 120 to initialize and enter a stable operating mode. Power measurements may now be made over some period of time to determine if the electronic device is in a low or high power state. If a high power state is determined, relay K1 remains set. If a low power state is determined, relay K1 is reset to open condition and power is again removed from outlet 120. Also, logic control unit 302 will again begin sleep mode cycling and power testing after a determined time period, for example, every ten minutes.

If a user wants to operate a device that is connected to outlet 120 and that outlet is turned off, in an exemplary embodiment, activating reconnection device 234 will immediately wake logic control unit 302 from sleep mode. Since the wake up was from the activation of reconnection device 234 and not due to power testing or capacitor CS recharging, logic control unit 302 will immediately set relay K1 to closed position to power the electronic device connected to outlet 120.

In addition to the embodiments described above, various other elements may be implemented to enhance control and user experience. One way to enhance user control is to allow a user to select the operating mode of an outlet. In an exemplary embodiment, power strip 100 further comprises a "Green Mode" switch that enables or disables the "green" mode operation. The green mode switch may be a hard, manual switch or it may be a signal to logic control unit 302. "Green" mode operation is the disengaging of outlet 120 from AC line input 110 when substantially no load is being drawn at outlet 120. A user may use the green mode switch to disenable green mode operation on various outlets when desired. For instance, this added control may be desirable on outlets that power devices with clocks or devices that need to be instantly on, such as a fax machine.

In one embodiment, power strip 100 includes LED indicators, which may indicate whether an outlet is connected to the power line and drawing a load current. The LED indicators may indicate whether an outlet is active, that is, power is drawn by an electronic device and/or the outlet has power available even if an electronic device is not connected. In addition, a pulsing LED may be used to show when power testing is being done or to indicate the "heartbeat" of sleep mode recharging.

In another embodiment, power strip 100 comprises at least one LCD display. The LCD display may be operated by logic control unit 302 to indicate the load power being provided to outlet 120, for example during times of operation. The LCD may also provide information about the power saved or power consumed by operating power strip 100 in or out of a "green" mode. For example, LCD may display the sum total of watts saved during a certain time period, such as the life of power strip 100 or in a day.

Various embodiments may also be used to enhance the efficient use of the power strip and/or individual outlets in the power strip. One such embodiment is the implementation of a photocell or other optical sensor monitored by logic control unit 302. The photocell determines whether light is present in the location of power strip 100 and logic control unit 302 can use this determination to disengage outlet 120 depending on the ambient light conditions. For example, logic control unit 302 may disengage power output 120 during periods of darkness. In other words, the power strip may be turned off at night. Another example is devices do not need power if located in a dark room, such as an unused conference room in an office. Also, the power outputs may be turned off when the ambient light conditions exceed a certain level, which may be predetermined or user determined.

In another embodiment, power strip 100 further comprises an internal clock. Logic control unit 302 may use the internal clock to learn which time periods show a high power usage at outlet 120. This knowledge may be included to determine when an outlet should have power available. In an exemplary embodiment, the internal clock has quartz crystal accuracy. Also, the internal clock does not need to be set to an actual time. Furthermore, the internal clock may be used in combination with the photocell for greater power strip efficiency and/or accuracy.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power strip circuits in addition to the circuits illustrated above. These alternatives can be suitably selected depending upon the particular application or in consideration of any number of factors associated with the operation of the system. Moreover, these and other changes or modifications are intended to be included within the scope of the present invention, as expressed in the following claims.

The invention claimed is:

1. A power strip configured to reduce power during idle operation of an electronic device, said power strip comprising:
   an alternating current (AC) line input comprising a plug and a cord configured to be connected to an external outlet;
   a plurality of outlets configured to transmit power to the electronic device, said external outlet is distinct from said plurality of outlets; and
   an outlet circuit configured to receive power from said AC line input and transmit power to a first outlet of said plurality of outlets, wherein said outlet circuit disengages transmitting power to said first outlet in response to said first outlet drawing substantially no power.

2. The power strip of claim 1, wherein said outlet circuit comprises:
   a current measuring system configured to monitor current from said AC line input, wherein said current measuring system provides an output power level signal that is proportional to a load at said first outlet;

a switch in communication with said current measuring system and said first outlet; and a control circuit configured to receive said output power level signal and control the opening and the closing of said switch to disengage said first outlet from power.

3. The power strip of claim 1, further comprising a green mode switch configured to select an operating mode of said first outlet, wherein said operating mode is at least one of a normal mode and a green mode.

4. The power strip of claim 1, further comprising at least one LED indicator configured to indicate if said electronic device at said first outlet is active, and wherein said at least one LED indicator is further configured to flash if said outlet circuit is testing said first outlet.

5. The power strip of claim 2, further comprising a reconnection device configured to override said control circuit and reengage said switch to a closed state, and wherein said reconnection device is further configured to disengage said switch to an open state.

6. The power strip of claim 5, wherein said reconnection device is located remotely from said power strip.

7. The power strip of claim 5, wherein said reconnection device is configured to override a single control circuit and reengage a single switch to a closed state, and wherein said reconnection device is further configured to disengage said single switch to an open state.

8. The power strip of claim 5, wherein said reconnection device is configured to override a plurality of control circuits and reengage a plurality of switches to a closed state, and wherein said reconnection device is further configured to disengage a plurality of switches to an open state.

9. The power strip of claim 1, wherein said substantially no power is approximately 0-1% of a typical maximum output load of said electronic device at said first outlet.

10. The power strip of claim 1, wherein said outlet circuit is configured such that parameters of said power strip may be modified by a user.

11. A power strip configured to efficiently provide power to an electronic device, said power strip comprising:

at least one outlet configured to provide power to said electronic device;

a switch having at least an open state and a closed state, wherein said switch is in communication with said at least one outlet and an alternating current (AC) line input;

a current measuring system configured to monitor the current drawn by said at least one outlet; and a control circuit configured to control the state of said switch;

wherein said control circuit sets said switch to the open state if the current drawn by said at least one outlet is below a threshold level, such that said at least one outlet is effectively disengaged from said AC line input.

12. The power strip of claim 11, wherein said control circuit controls a plurality of said at least one outlet.

13. The power strip of claim 11, further comprising a reconnection device configured to override said control circuit and re-engage said switch to the closed state.

14. The power strip of claim 11, further comprising:

a current sensor and a logic control unit inside said control circuit; and a photocell configured to indicate a level of ambient light surrounding said power strip, wherein said logic control unit is configured to disengage said at least one outlet based upon the level of ambient light.

15. The power strip of claim 14, further comprising an internal clock, wherein said logic control unit uses said internal clock to determine periods of use of said at least one outlet.

16. The power strip of claim 11, wherein said threshold level is a percentage of a determined approximate low power level of said electronic device, and wherein said percentage of said determined approximate low power level is at least one range of approximately 100-105%, approximately 100-110%, and approximately 110-120%.

17. The power strip of claim 11, wherein said at least one outlet comprises a first outlet with a first threshold level and a second outlet with a second threshold level, wherein said first threshold level is different from said second threshold level.

18. A method of facilitating a power strip with low power consumption, the method comprising:

providing power to an electronic device at an outlet;

monitoring, with a current measuring system, a load condition at said outlet to generate a measured load condition;

transmitting the measured load condition to a control circuit;

controlling, with said control circuit, the state of a switch; and setting said switch to an open state if the load condition is below a threshold level and disengaging said outlet from an alternating current (AC) line input.

19. The method of claim 18, further comprising a testing method of the load condition at said outlet, said testing method comprising:

setting said switch to a closed state; and determining if the load condition is below the threshold level.

20. The method of claim 18, further comprising:

determining said threshold level based upon the monitoring of the load condition at said outlet; and electrically isolating said control circuit from said AC line input using a power disconnect.

21. The power strip of claim 1, wherein said outlet circuit is further configured to transmit power to a second outlet of said plurality of outlets, wherein said outlet circuit disengages transmitting power to said second outlet of said plurality of outlets in response to said second outlet drawing substantially no power.

22. The power strip of claim 1, further comprising a second outlet circuit configured to transmit power to a second outlet of said plurality of outlets, wherein said second outlet circuit disengages transmitting power to said second outlet of said plurality of outlets in response to said second outlet drawing substantially no power.

* * * * *